United States Patent Office 3,055,737
Patented Sept. 25, 1962

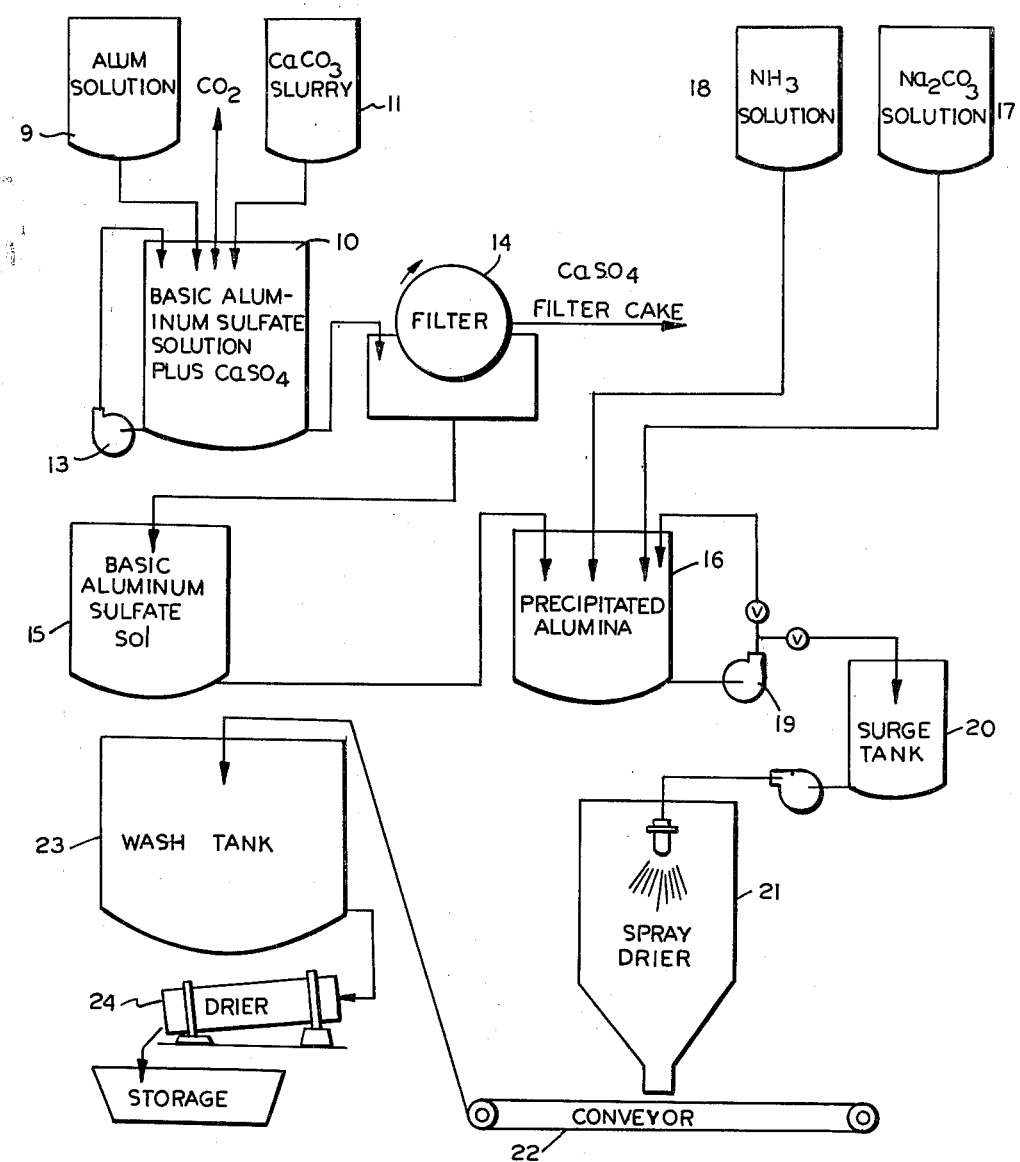

3,055,737
PROCESS FOR PREPARING ALUMINA GELS
Charles P. Wilson, Jr., Cincinnati, Ohio, and Frank G. Ciapetta, Silver Spring, and James W. Elston, Jr., Baltimore, Md., assignors to W. R. Grace & Co., New York, N.Y., a corporation of Connecticut
Filed May 25, 1960, Ser. No. 31,771
6 Claims. (Cl. 23—143)

This invention relates to alumina gels. In one specific embodiment it relates to a process for preparing alumina gels having low soda content, high pore volume and high surface area. This application is a continuation in part of my application S.N. 19,514, filed April 4, 1960.

Hydrous alumina or alumina gel is generally formed by adding ammonia or alkali to a suitable salt such as aluminum sulfate. The precipitate is very voluminous and gelatinous. The gel often contains not over 10% alumina, the balance being water. In this form it is the most reactive of the hydrous aluminas and combines with both acid and alkali. The gel can be dried to a hard glass-like material and activated by heating. It has a high surface area which makes it useful as an absorbent and catalyst or as a catalyst support.

The extent of the surface area of the gel aluminas are dependent upon their mode of preparation and degree of activation. Commercial forms have surface areas which range from 100 to 400 m.$^2$/g. and most of the types contain soda as an impurity. An alumina having a high soda content finds little or no application as an absorbent or catalyst because the soda contaminated alumina gels cannot withstand high reactivation temperatures.

Although satisfactory alumina gels can be obtained on a laboratory scale by the precipitation of alumina from an aluminum salt such as alum, using techniques incorporating ammonia and soda as precipitating agents, such procedures, prior to our invention, have been impractical on a commercial scale. When alumina is freshly precipitated by the addition of ammonia, difficulty is frequently encountered in filtering the slurry. Although filtration of small batches can be accomplished, continuous commercial operation becomes extremely difficult and costly because of blinding in the filter cloth. These filtration difficulties prevent the adequate removal of ammonium sulfate which is formed in preparing the alumina gel. Although ammonium sulfate can be more readily washed from alumina gel after its gelatinous characteristic has been modified by drying, the obstacles presented in commercial scale drying of precipitated alumina in the presence of large amounts of ammonium sulfate are even more insurmountable than those presented in the continuous filtration. In the first place, ammonium sulfate volatilizes during drying and presents a nuisance in the flue gas when present in excessive quantities. This is a particular problem where catalyst plants are located in populated areas. Then, too, ammonium sulfate readily decomposes into objectionable gaseous ammonia with the consequent liberation of free sulfuric acid which attacks the freshly precipitated aluminum gel to form various water soluble sulfates of aluminum. For example, during commercial drying of an alumina gel slurry which is precipitated by an excess of ammonia to a pH of 8.0, the pH of the dried product dropped to 4.0. At this pH approximately 55% of the added ammonia had been evolved from the spray dried product and about one fourth of the ammonia reverted back to free ammonia which passed up the stack with the flue gases.

Apart from economic reasons, the loss of ammonia renders a spray dried product unstable. Thus, when drying aluminas which have been precipitated in part by ammonia and in part by soda ash, the pH of the dried product must not be less than 4.3 and preferably above 4.5 to eliminate the presence of objectionable sulfates which hydrolyze to form gelatinous alumina floc. The presence of this floc prevents washing by decantation or filtering procedures. This difficulty is not eliminated by substitution of soda ash as a precipitant. Alumina gels precipitated entirely by soda ash are also difficult to filter prior to drying. Although the pH of such gels remains stable during drying, the dried products are too low in density and too soft to find commercial acceptance.

It is, therefore, an object of this invention to provide a practical commercial process for preparing alumina gels from alum solutions wherein the density and hardness of the final gel is satisfactory and which, at the same time, has an exceptionally high pore volume, high surface area and low soda content. This is realized by adding, in the first step, an aqueous slurry of calcium carbonate to the aluminum sulfate solution, separating the calcium sulfate from the resulting basic aluminum sulfate sol and carrying out the balance of the precipitation in three additional steps. In the second step, soda ash is added to increase the pH to 3.9. The pH is increased from 3.9 to 5.0 by the addition of ammonium hydroxide and is then increased from 5.0 to 6.0 using soda ash. After this four-step neutralization is complete, the gelled alumina is dried and purified.

A significant advantage of this process is that the principal neutralizing agent is lime rock, which is an abundant and inexpensive raw material. A further advantage which is gained by the use of lime rock is that the product formed when calcium carbonate is added to alum solutions is calcium sulfate. Calcium sulfate is completely insoluble in water and lends itself readily to removal by filtration. The use of a plurality of precipitating agents is advantageous in that the properties of the final product can be controlled by varying the amount of each precipitant and the manner in which they are used.

In carrying out the process, an aqueous slurry of calcium carbonate is added to an alum solution in an amount which is insufficient to completely neutralize the alum. Since alum solutions are prepared by dissolving aluminum hydrate in sulfuric acid, the solution often contains about 1–2% free sulfuric acid. The calcium carbonate is previously ground to a finely divided form for intimate contact with the alum. The addition of calcium carbonate is stopped at a pH below that which any aluminous precipitant is formed. This has been found to be at a pH of not more than 3.5–3.7 using an alum solution containing 94 g. per liter of alumina ($Al_2O_3$) at a temperature below 110° F. If the calcium carbonate addition is continued to a pH above 3.5–3.7, the product recovered will form an unstable sol. Under the prescribed conditions, not less than 35 and up to 50% of the alum is neutralized while, at the same time, all of the alumina remains in solution as a basic aluminum sulfate sol.

Following addition of the requisite amount of calcium carbonate, the basic aluminum sulfate sol is separated by suitable means such as filtration from the precipitated calcium sulfate and recovered as the filtrate for further processing. A significant feature of this process is the simplicity with which appreciable amounts of a principal impurity, that is, the sulfate ion, is removed.

Following removal of calcium sulfate, soda ash is added to the basic alumina sulfate sol in the second step of a four-step neutralization. Soda ash is added to increase the pH to 3.9. In the third step, the pH is increased from 3.9 to 5.0 using ammonium hydroxide. This takes the alumina past the gelation stage (pH 4.3) by using ammonium hydroxide as a precipitant. In the fourth stage, the pH is increased from pH 5.0 to pH 6.0 using soda ash. Experience has shown that a pH of at least 5.0 is required in the absence of ammonia to obtain a dried product which, when reslurried with water in subsequent washing, will have a pH above 4.3. The pH adjustment at this point is critical in that addition of sodium carbonate solution is necessary to stabilize the basic aluminum sulfate to permit further processing. Addition of sodium carbonate solution to give a dried product having a pH greater than 6.5 is also to be avoided because the use of sodium carbonate to obtain high pH values tends to increase the macropores and lower the density of the washed product below desirable levels.

A further advantage in the use of calcium carbonate is realized in the recovery of gaseous carbon dioxide which is evolved during the process. It may be used as a reagent in neutralizing sodium silicate solutions to prepare silica-alumina hydrocracking catalysts as described in U.S. Patent 2,886,512.

Following the final addition of sodium carbonate to stabilize the pH of the alumina gel, the slurry may be filtered and the recovered gel particles then spray dried. In the preferred embodiment, the filtration step is omitted and the slurry is fed through the spray dryer to form microspherical particles. As a precaution against undue hydrolysis, dispersion or peptization, the spray dried product is cooled to room temperature prior to the washing step. Decantation washing is preferred over continuous filtration washing methods because the longer soaking time involved at the high pH is desirable for removal of sulfate impurities. Washing is preferably carried out using deionized water, heated to a temperature of about 110–130° F., with the pH of the solution adjusted to 9.0–9.5 by the addition of ammonia. Although the process permits reducing sulfate and soda to extremely low levels, this is frequently not necessary. The preferred maximums are 0.05% soda and 2% sulfate. The purified particles are then redried by any suitable means or the product may be spray dried directly in slurry form.

The invention is illustrated graphically by the flow diagram set out in FIGURE I. A quantity of alum from tank 9 is added to the first filtration tank 10 and the calcium carbonate slurry is added to the alum solution from the storage tank 11. The slurry is mixed by an agitator and recirculation through the pump 13 back into the tank 10. After the reaction is complete, the slurry is pumped into the filter 14 and the calcium sulfate cake is removed. The alumina sol is transferred to tank 15 from which it is metered into the second precipitation tank 16. Metered amounts of sodium carbonate are added from the tank 17 followed by the addition of ammonia from the tank 18. This slurry is mixed by an agitator and by pumping through the pump 19 back into the tank 16. When the precipitation is complete, the slurry is moved through the pump 19 to the surge tank 20. The slurry is pumped from the surge tank 20 into the spray dryer 21, is discharged onto a conveyor 22 and cooled to room temperature. The slurry, at room temperature, is then transferred to wash tank 23 where it is washed and after the sodium and sulfate contents have been reduced to a suitable level is transferred to the dryer 24 for final drying. The product removed from the dryer is transferred to storage.

The invention is further illustrated by the following example.

Example I

A total of 3000 gal. of alum (containing 7.14% alumina and 20.3% sulfate) was pumped into a precipitation tank heated to about 80° F. A quantity of calcium carbonate slurry, prepared by mixing finely divided calcium carbonate and water in about equal parts by weight, was added to the tank and the mixture stirred by rotary agitation and circulation through a centrifugal pump. The addition of calcium carbonate at room temperature was continued until the pH of the slurry reached 3.5 to 3.7. At this point the precipitated calcium sulfate was removed from the basic aluminum sulfate solution by filtering at 100° F. The filtrate containing the basic aluminum sulfate by (analysis 7.84% alumina and 11.19% sulfate) was pumped into a precipitation tank. Soda ash solution was added to the alumina sol to a pH of 3.9. The agitation was continued throughout the addition by passing the slurry through a circulation pump and back into the tank. The soda ash addition was stopped at pH 3.9 and ammonia was added to bring the pH of the slurry to 5.0. When the pH reached 5.0 the ammonia addition was discontinued and soda ash was added to increase the pH to 6.0. The agitation was continued as in the prior addition of precipitant.

The quantities of precipitating agent employed to bring 3000 gal. of this alum to this pH were as follows: (1) To increase the pH to 3.5, 1.62 lbs. of calcium carbonate were added per lb. of alumina present. (2) Increasing the pH from 3.5 to 3.9 required .19 lb. of soda ash per lb. of alumina. (3) The ammonia precipitation required 0.16 lb. of ammonia per lb. of alumina and the final pH adjustment required 0.9 lb. of sodium carbonate per lb. of alumina. The slurry at this stage had a pH of 6.0 and was pumped into a commercial spray dryer. The dryer was operated at an inlet temperature of 800° F. and a product discharge temperature of 300° F. The material to be dried was added at a pressure of 750–800 lbs. per square inch using 13 nozzles 0.09 inch in diameter. The spray dried product was collected and cooled to room temperature prior to washing. The product was reslurried with deionized water and washed by decanting using deionized water adjusted to pH 9.0 with ammonia. The washed product was then settled to separate free water and dried at 300° F.

Analysis of the chemical and physical properties of the alumina gel prepared according to the preceding example is as follows:

| | |
|---|---|
| $Na_2O$ | 0.025%. |
| $SO_4$ | 1.0%. |
| CaO | 0.11%. |
| Surface area (after 3 hrs. at 1000° F.) | 297 m.²/g. |
| Pore volume, nitrogen (BET method) | 0.70 cc./g. |
| Density | 0.42 cc./g. or 26 lbs./cu. ft. |

Obviously many modifications and variations of the invention as hereinabove set forth may be made without departing from the essence and scope thereof and only such limitations should be made as are indicated in the appended claims.

What is claimed is:

1. A process for preparing alumina gels which comprises contacting an aluminum sulfate solution with an aqueous slurry of calcium carbonate to form a basic aluminum sulfate sol at a pH of 3.5 to 3.7, adding sufficient sodium carbonate to said sol to increase the pH of said sol to 3.9, adding sufficient ammonium hydroxide solution to gel the alumina and form a viscous slurry having a pH of 5.0, adding sufficient sodium carbonate to increase the pH of the gelled alumina to a pH of 6.0 and washing said particles to remove soluble impurities and drying said gel.

2. A process for preparing alumina gels which comprises contacting an aluminum sulfate solution with an aqueous slurry of finely divided calcium carbonate to form a mixture of calcium sulfate and a basic aluminum sulfate sol at a pH of 3.5 to 3.7, separating the sol from said mixture, adding sufficient sodium carbonate to increase the pH of said sol to 3.9, adding sufficient ammonium hydroxide to gel the alumina and form a viscous slurry having a pH of 5.0, adding sufficient sodium carbonate to increase the pH of said slurry to a pH of 6.0 and washing said particles to remove soluble impurities and drying said gel.

3. A process for preparing alumina gels which comprises contacting an aluminum sulfate solution with an aqueous slurry of finely divided calcium carbonate to form a mixture of calcium sulfate and basic aluminum sulfate sol at a pH of 3.5 to 3.7, separating the sol from said mixture, adding sufficient sodium carbonate to increase the pH of said sol to pH 3.9, adding sufficient ammonium hydroxide to gel the alumina and form a viscous slurry having a pH of 5.0, adding sufficient sodium carbonate to increase the pH of said sol to a pH of 6.0 and drying, washing said particles to remove soluble impurities and redrying the purified gel.

4. A process for preparing alumina gels which comprises contacting aluminum sulfate solution with an aqueous slurry of finely divided calcium carbonate to form a mixture of calcium sulfate and basic aluminum sulfate sol at a pH of 3.5 to 3.7, separating the sol from said mixture, adding sufficient sodium carbonate to said sol to increase the pH to pH 3.9, adding sufficient ammonium hydroxide solution to gel the alumina and form a viscous slurry having a pH of 5.0, adding sufficient sodium carbonate solution to increase the pH to 6.0, spray drying said slurry to form microspheroidal alumina gel particles, washing said particles to remove soluble impurities and redrying the purified particles.

5. A process according to claim 4 wherein the spray dried particles are purified by washing with an ammoniacal solution heated at a temperature of about 110° F. to 130° F. and having a pH of 9.0 to 9.5.

6. A process for preparing alumina gels which comprises contacting an aluminum sulfate solution at a maximum temperature of 100° F. with a sufficient amount of an aqueous slurry of finely divided calcium carbonate to form a mixture of calcium sulfate and a basic aluminum sulfate at a pH of 3.5, separating the sol from said mixture at a temperature below 120° F., adding sufficient 25% sodium carbonate solution to increase the pH of said sol to pH 3.9, adding sufficient 25% ammonium hydroxide solution to gel the alumina and form a viscous slurry having a pH of 5.0, adding sufficient 25% sodium carbonate solution to obtain a pH of 6.0, spray drying said slurry, purifying the dried particles with an ammoniacal solution at a temperature of 130° F. and a pH of 9.5 and redrying the purified particles at 300° F.

References Cited in the file of this patent

UNITED STATES PATENTS

| | | |
|---|---|---|
| 2,898,306 | Cramer et al. | Aug. 4, 1959 |
| 2,913,400 | Burton et al. | Nov. 17, 1959 |

OTHER REFERENCES

Mellor: "A Comprehensive Treatise on Inorganic and Theoretical Chemistry," vol. 5, Longmans, Green and Co., N.Y., 1924, page 338.